United States Patent [19]
Lee

[11] Patent Number: 5,241,524
[45] Date of Patent: Aug. 31, 1993

[54] METHOD OF EDGE RECORDING ON OPTICAL RECORD MEDIUM

[75] Inventor: Tzuo C. Lee, Sunnyvale, Calif.

[73] Assignee: Olympus Optical Co., Ltd., Tokyo, Japan

[21] Appl. No.: 574,103

[22] Filed: Aug. 29, 1990

[51] Int. Cl.$^5$ ............................................. G11B 7/125
[52] U.S. Cl. ........................................ 369/50; 369/58; 369/54; 369/109; 369/116; 369/59
[58] Field of Search ............... 369/50, 54, 58, 47, 369/48, 49, 124, 116, 109, 32, 59; 375/21, 22, 23

[56] References Cited

U.S. PATENT DOCUMENTS

| | | | |
|---|---|---|---|
| 4,835,759 | 6/1986 | Saito et al. | 369/124 |
| 4,941,139 | 7/1990 | Kulakowski et al. | 369/116 |
| 5,001,692 | 3/1991 | Farla et al. | 369/116 |
| 5,109,373 | 4/1992 | Ohno et al. | 369/116 |

FOREIGN PATENT DOCUMENTS 2-54423  2/1990  Japan .
2-54424  2/1990  Japan .

*Primary Examiner*—Aristotelis Psitos
*Assistant Examiner*—Muhammad Edun
*Attorney, Agent, or Firm*—Stevens, Davis, Miller & Mosher

[57] ABSTRACT

In a method of recording information on an optical disk with the edge recording technique, input data representing the information to be recorded is first converted into a channel bit stream with a chosen code, such as the (2,7) code, and then the different mark lengths are determined by the composition of the channel bit stream, and then a plurality of recording pulses for recording a mark having a length longer than the smallest mark length are generated, said recording pulses having the same pulse width, but the timing of the last recording pulse being adjusted with respect to the remaining recording pulses such that the correct written mark length can be obtained. Finally a writing laser beam is modulated in accordance with the recording pulses.

9 Claims, 12 Drawing Sheets

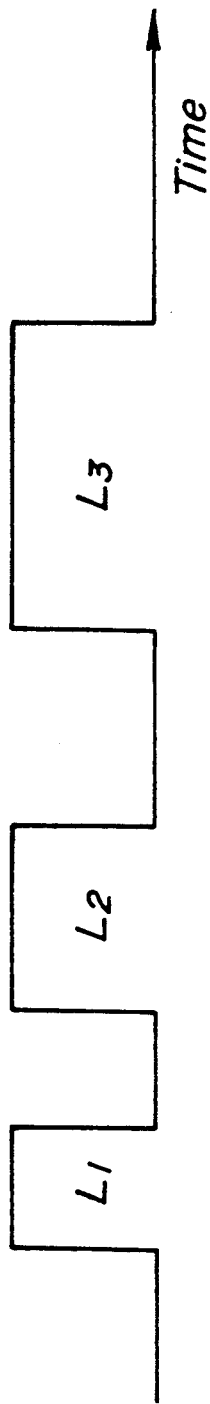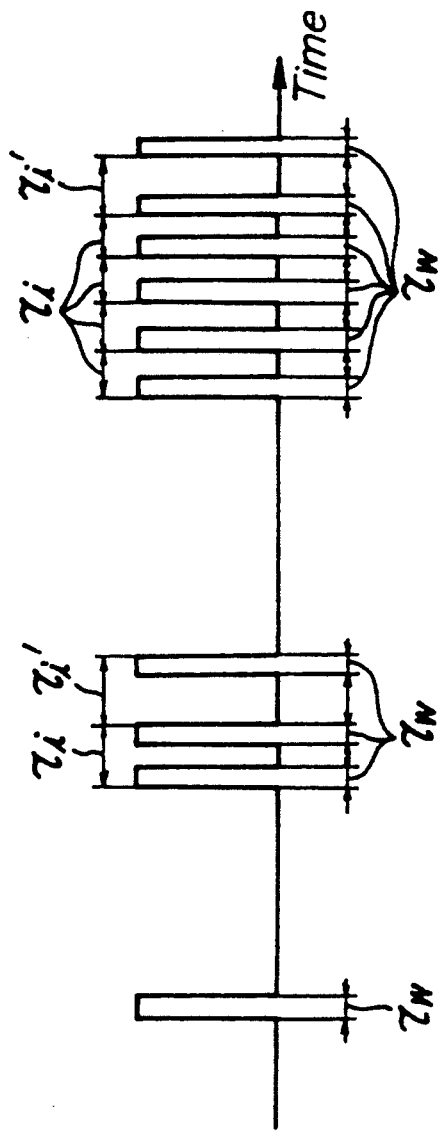
FIG. 1A
FIG. 1B
FIG. 1C

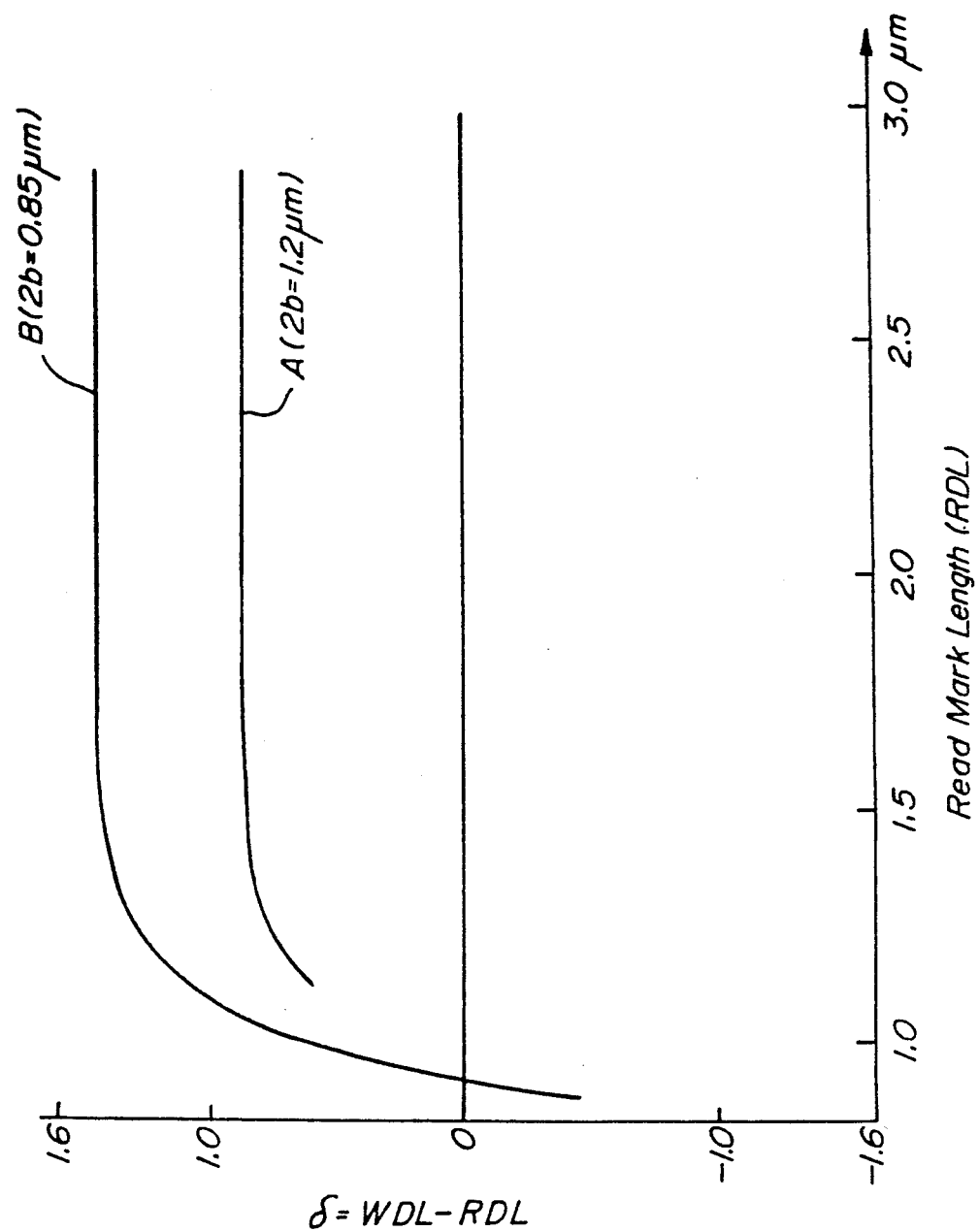

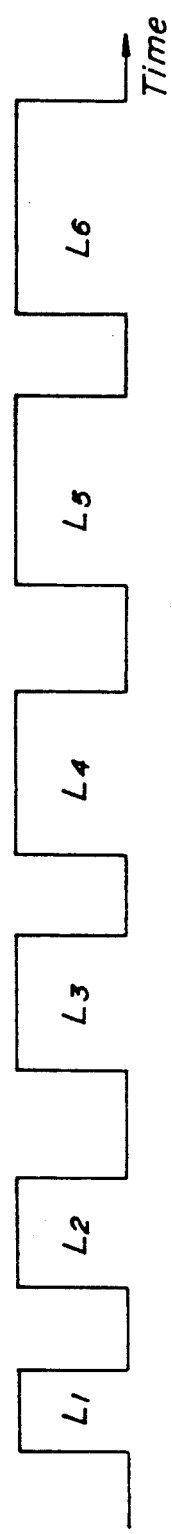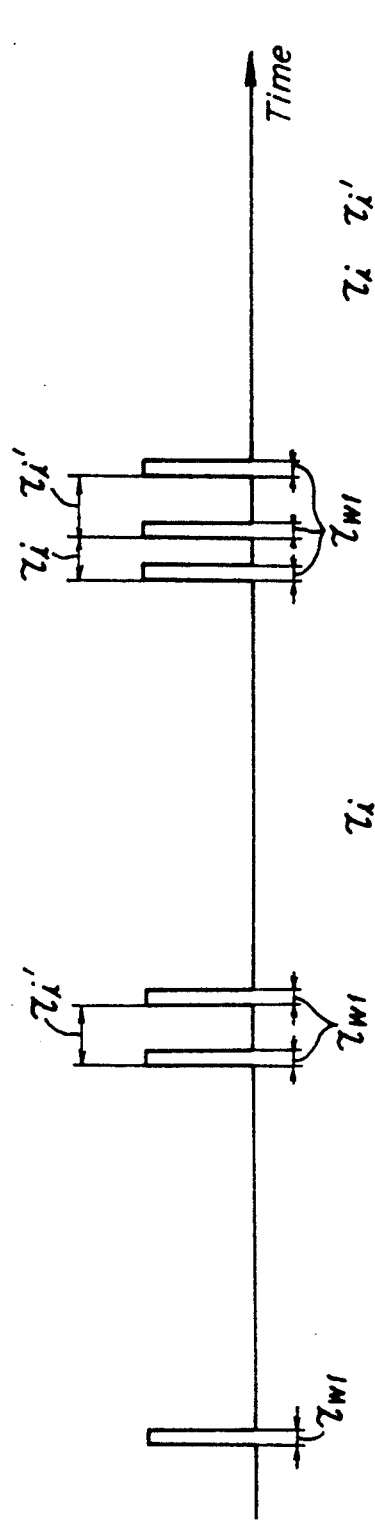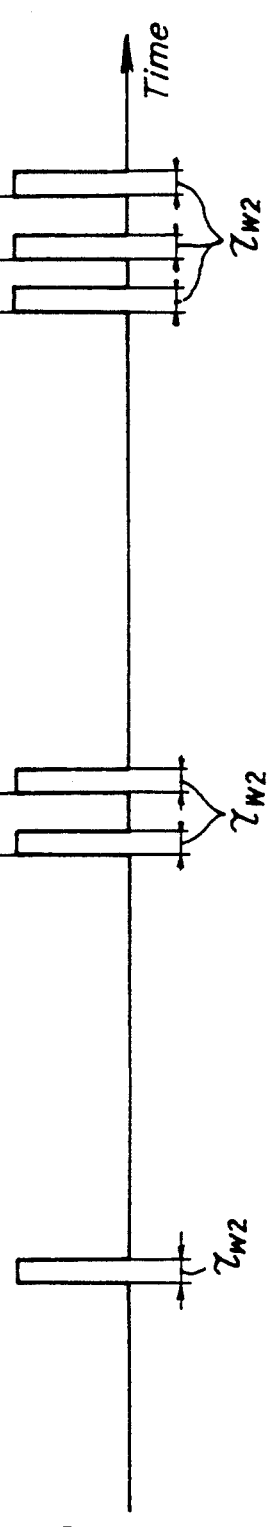
FIG.3A  FIG.3B  FIG.3C  FIG.3D

P = 6 mW
$\tau$ = 30 ns
v = 5.65 m/s
b = 0.6 μm

P = 6 mW
$\tau$ = 50 ns
v = 5.65 m/s
b = 0.6 μm

METHOD OF EDGE RECORDING ON OPTICAL RECORD MEDIUM

BACKGROUND OF THE INVENTION

Field of the Invention and Related Art Statement

The present invention relates to a method of recording information on an optical record medium, and more particularly to a method of recording information with the edge recording on an optical record medium such as magneto-optic record disk and write-once type optical disk and card.

Presently there are two known methods of recording information, e.g. channel bits on an optical record medium such as an optical record disk. One, the most commonly practiced today, is called the mark position recording method, where a write laser light beam is either turned on or turned off at the proper location and the written spots have always the same size. The marked spot within the detection window is a "1" bit, while the un-marked spot represents a "0" bit. Another technique is called the edge recording method, where the mark size or mark length measured along an information track on the optical record disk is intentionally varied by proper modulation of the writing laser beam. The transition which occurs at the boundary of the mark is a "1" bit, while the length of the mark represents the number of "0" bits between successive "1" bits.

The edge recording method has the potential to provide a significant gain G in recording density over the mark position recording method. The gain G is dependent on the code with which the data bits are translated into channel bits. It is not hard to show that $$G = (d+1)/\alpha \tag{1}$$

where d is a code parameter out of (d, k, m, n, r) and specifies the minimum number of "0" bits between two nearest "1" bits. It should be noted that k specifies the maximum number of "0" bits between two nearest "1" bits. For example, in (1, 7) RLL (Run Length Limited) code, d is 1 and in (2, 7) RLL code, d is 2, $\alpha$ is a factor in mark position recording given by, $$\alpha = L_{t, min}/L_c \tag{2}$$

where $L_{t, min}$ is the smallest mark length and $L_c$ is the unit channel bit length.

Let us use (2, 7) code as an example where d=2, and $\alpha$ is about 1.5, according to industry experience with (2, 7) code optical recording, therefore G is 2. This is an impressive gain if it can be realized.

The difficulties of the edge recording lie in several areas:

(a) It is difficult to write marks of long length with a single pulse. This is because the mark size will increase both along the information track direction and perpendicular to the track direction, and will become large enough to cause cross-talk problem with adjacent tracks if the intended mark length is significantly longer than the track pitch. It has been indicated by the computer simulation that the cross track dimension of the mark becomes 1.6 $\mu$m when the mark length exceeds 2 $\mu$m under reasonable media parameters and recording conditions.

(b) The read domain or mark length (RDL) and the written domain or mark length (WDL) are different from each other because the read signal is a convolution of the optical spot with the written mark; the difference is dependent on the read spot size and on the mark length. Since the spot intensity has roughly a Gaussian-like distribution, with a Gaussian diameter of about 1.5 $\mu$m for an optical head with an NA of 0.55, the convolution result, i.e. the read mark length RDL is quite different from the written mark length WDL. Applicant's simulation work indicates that when WDL is small, less than 1 $\mu$m or so, the difference WDL-RDL is negative and is a strong function of WDL, while when WDL is larger than 1 $\mu$m, RDL-WDL turns positive and becomes a constant when WDL is larger than 1.6 $\mu$m. Since RDL is what counts in the detection process, it is necessary to translate the desired RDL into the proper WDL during the recording process.

(c) In the edge recording method the mark length has to be very accurate, much more so than with the mark position recording method. In the latter method, the presence or absence of a mark is what counts. Since peak detection method is used to determine this, the detection is less prone to error even if the mark is somewhat larger than the window allocated to the particular channel bit. With edge recording method, if the minimum mark length changes by $\pm x$ percent, then the "1" bit window at either end of the mark has shrunk by y percent, where y is given by, $$y = x \cdot (d+1) \tag{3}$$

Thus, if the mark length increases or decreases by 5%, the detection window loss is 15% in (2, 7) code and 10% in (1, 7) code, which is significant. Since the window size is small to start with for high density recording, such loss is unbearable from data detection point of view.

Factors that contribute to written mark length variation include media sensitivity variation from one disk to another, temperature variation in the drive and write power variation. These causes depend on external factors while the problem mentioned in (b) can be predicted a-priori.

In Japanese Patent Application Laid-Open Publication Kokai Hei No. 2-54423, there is described an improved edge recording method. In this known edge recording method, a mark having the shortest length is written by a single pulse, but marks having a longer length than the shortest length are recorded with the aid of a plurality of recording pulses. That is to say, during the writing of the longer marks, the writing laser beam is repeatedly turned on and off. By modulating the writing laser beam in the manner explained above, the heat given by the writing laser beam can be lost relatively quickly and residual heat becomes small, so that the enlargement of written marks is somewhat limited. However, the written marks having longer lengths are still prolonged. In the above-mentioned Japanese Publication it is also proposed that the power of the writing laser beam pulses be changed in dependence on the sensitivity of the optical disk. That is to say, the power of the writing laser beam pulses is controlled to such a level that the rear edge of the written mark becomes coincident with a desired position. However, it has been experimentally confirmed that this solution could not compensate for the prolongation of the written mark length accurately and also it is practically impossible to change the power of writing laser beam pulses precisely. Furthermore, the difficulty (b) mentioned previously was not addressed at all, while (b) is the most important cause of RDL errors.

SUMMARY OF THE INVENTION

The present invention has for its object to provide a novel and useful method of edge recording on an optical record medium, in which the above-mentioned drawbacks of the known recording methods can be removed and the channel bit data can be recorded accurately.

According to the invention, a method of recording data with the edge recording mode on an optical record medium comprises:

converting input data to be recorded into a channel bit stream;

generating a recording pulse train in accordance with the channel bit stream such that a longer mark than a unit length mark is recorded with the aid of a plurality of recording pulses and the composition of said plurality of recording pulses being adjusted such that a written mark has a predetermined length which, upon being read by the focused laser spot, will produce the desired RDL; and modulating a light beam to be made incident upon the optical record medium in accordance with said adjusted recording pulse train.

According to the edge recording method of the invention, there are two operation modes. In a first operation mode, the number of recording pulses is increased by one for the next longer mark, starting from a single recording pulse for the shortest mark. The pulse widths and the pulse-to-pulse separation are the same except for the last pulse. The timing of the last recording pulse is retarded or advanced in order to create the desired written mark length. The desired read mark length increment for the next longer mark is given by, $$L = L_1/(d+1) \tag{4}$$

where $L_1$ is the minimum read mark length; hereafter L is a short-hand representation of RDL.

The first operation mode is more suitable for codes with a low "d" value, like the (1, 7) code. It is not as attractive for higher "d" value codes such as the (2, 7) code. This is related to the fact that the pulses are too close in the high "d" case, and in certain cases, the multiple pulses will merge into a single pulse unless a laser with very high power is utilized. A second operation mode does not suffer from such a demerit.

In the second operation mode, there are provided two pulse series; the first series creates written marks with lengths $WDL_1$, $WDL_3$, etc and the second series $WDL_2$, $WDL_4$, etc. Again the number of pulses is increased by one for the next mark length within the series. The individual pulses within each series are again identical and the timing of the last pulse is adjusted to carry out the compensation mentioned earlier. The only difference of the pulses in the two series is the pulse width; that is, $WDL_1$ and $WDL_2$ are created by single pulses to meet the respective length requirements.

The advantage of the second operation mode is that the pulses in the recording pulse train are not crowded and one derives the full benefit of the successive write pulse addition recording.

BRIEF DESCRIPTION OF THE DRAWINGS

FIGS. 1A to 1C show a first embodiment of the edge recording method according to the invention, in which the first operation mode is used;

FIG. 2 is a graph illustrating the relationship between the read mark length and the difference between WDL and RDL;

FIGS. 3A to 3D depict a second embodiment of the edge recording method according to the invention, in which the second operation mode is adopted;

DESCRIPTION OF THE PREFERRED EMBODIMENTS

Figure 4A:
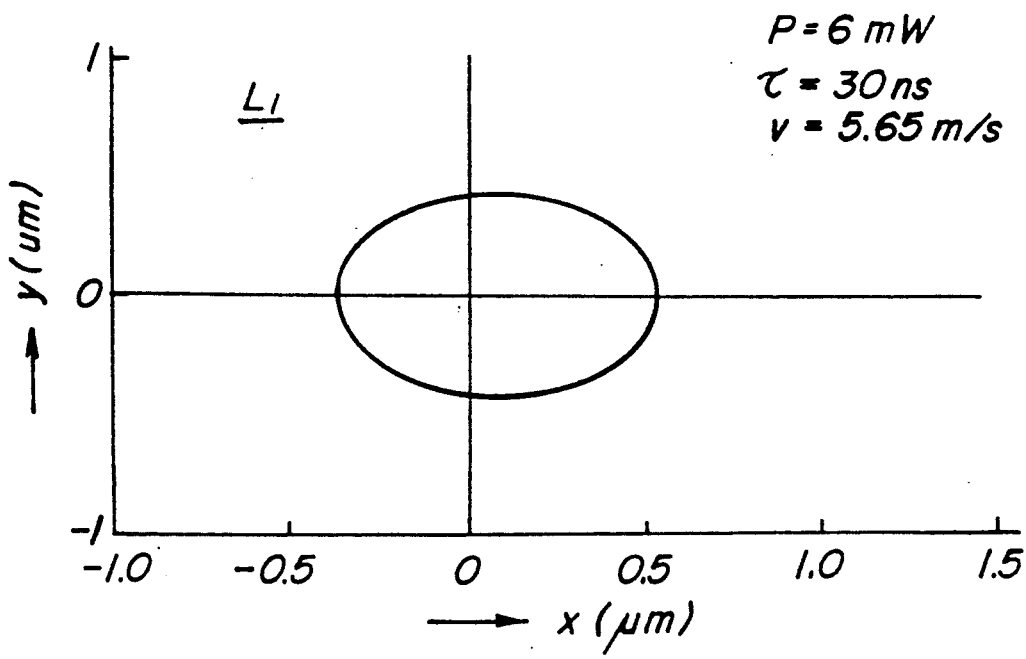
FIGS. 4A to 4D show schematically the enlargement of written marks having different mark lengths.
Figure 4B:
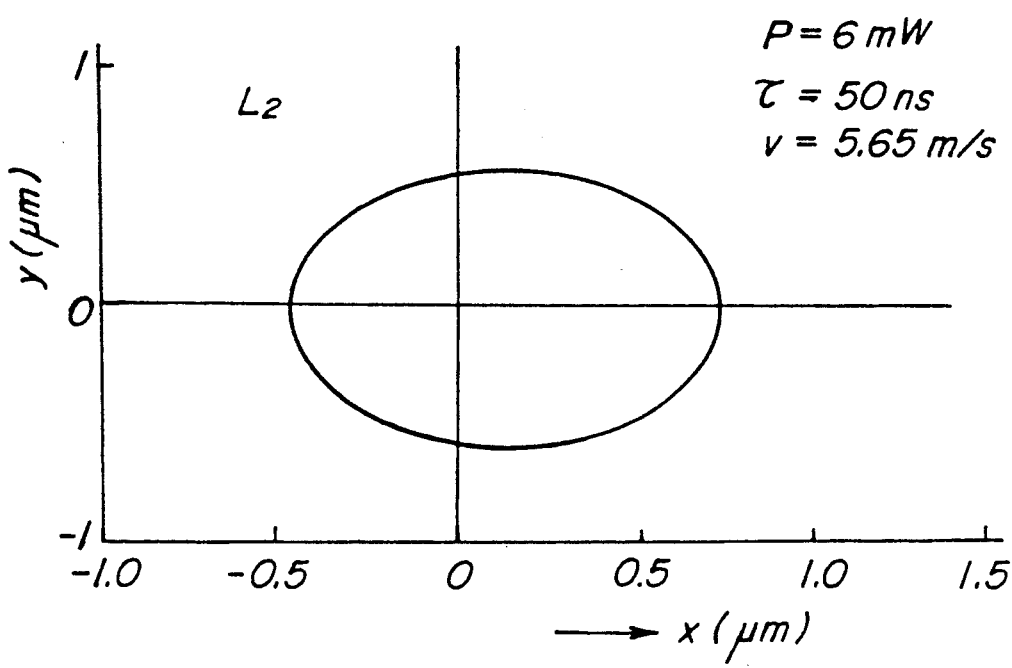
Figure 4C:
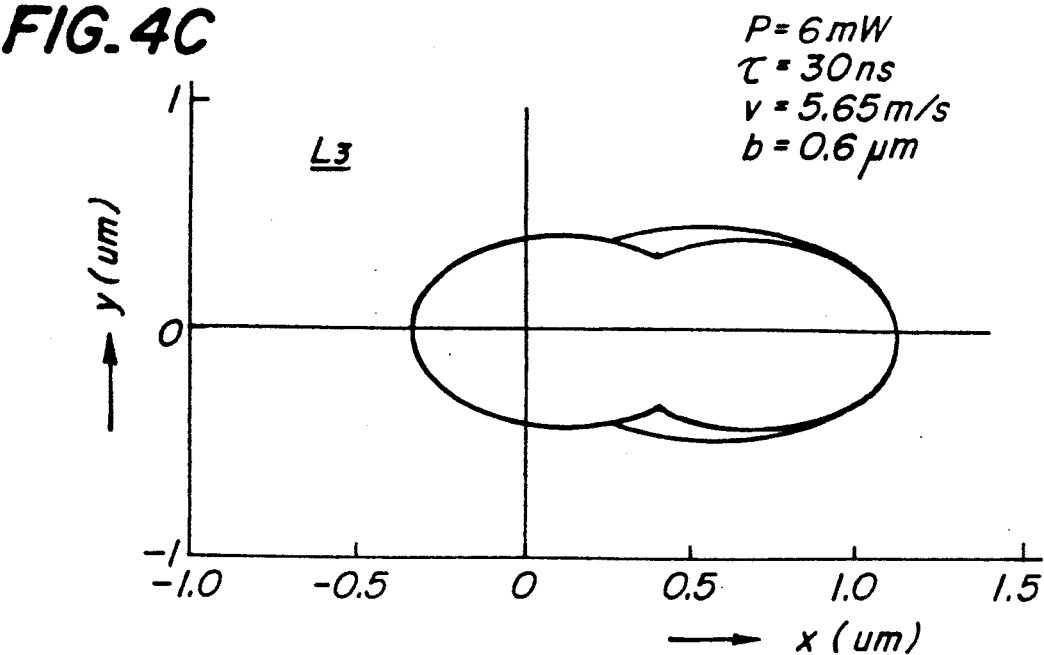
Figure 4D:
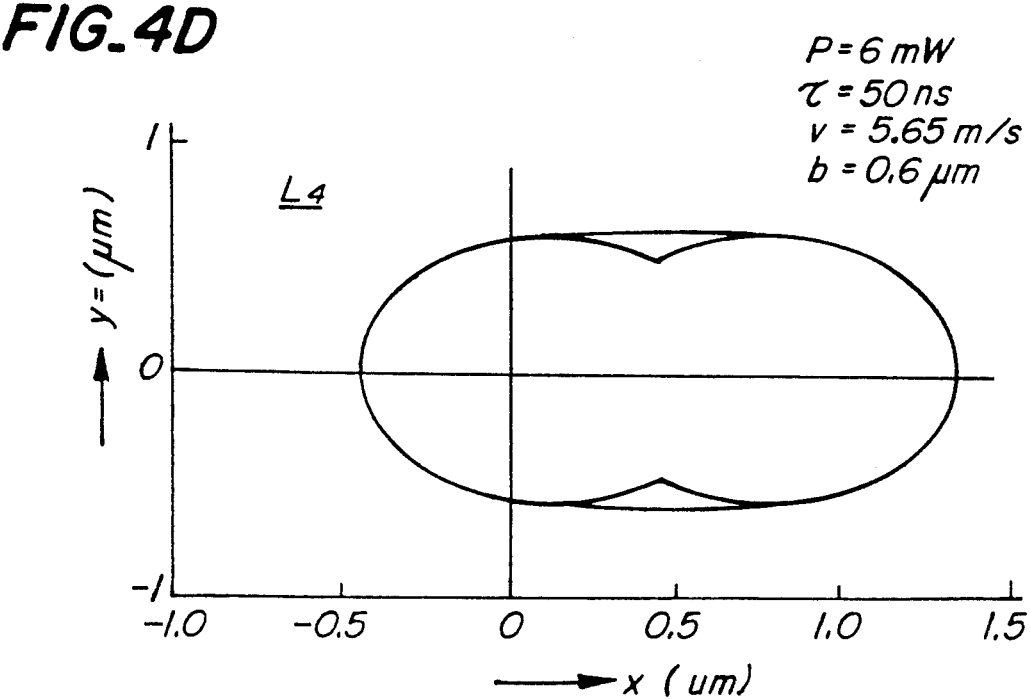

FIG. 1 shows a first embodiment of the edge recording method according to the invention. The present embodiment utilizes the above-mentioned first mode of operation in order to compensate for the difference of RDL and WDL and for the mark length enlargement due to the residual heat. At first, input data to be recorded on an optical disk is converted into a channel bit stream with ECC in accordance with a given code. In the present embodiment, the (2, 7) RLL code is used. In the (2, 7) code, the minimum number of "0" bits between successive "1" bits is 2 and the maximum number of "0" bits between successive "1" bits is 7. FIG. 1A shows the converted channel bit stream to be recorded on an optical record disk and FIG. 1B illustrates desired mark lengths $L_1$, $L_2$ and $L_3$. In general, the write pulse train contains n pulses to create the mark length $L_n$, where the largest n value is $k-d+1$ for a (d, k) code. In the present embodiment, since the (2, 7) code is used, the mark length $L_2$ is formed by three pulses and the mark length $L_3$ is written by means of six pulses. The power and width $\tau_w$ of the writing laser pulses are identical and the pulse interval $\tau_i$ is kept the same except for the last pulse where interval $\tau_i'$ is adjusted to compensate for the difference of RDL and WDL.

FIG. 2 illustrates a computer simulation of $\delta$ vs RDL, where $\delta$ represents a difference between the written mark length and the read mark length and can be expressed by $$\delta = WRL\text{-}RDL \tag{5}$$

Curves shown in FIG. 2 are obtained by convoluting the read spot of a Gaussian diameter $2a$ of 1.5 $\mu$m with marks of various lengths for different radii of curvature b at a front edge of the written mark. That is to say, a curve A represents the relationship between $\delta$ and read mark length RDL for $2b=1.2$ $\mu$m and a curve B of $2b=0.85$ $\mu$m. As can be read from these curves A and B, when the read mark length becomes longer than about 1.5 $\mu$m, the difference $\delta$ between the written mark length and the read mark length becomes large. The bandwidth of the track is assumed 0.85 $\mu$m which imposes a cross track limit for the detectable mark at 0.85 $\mu$m. It should be noted that $\delta$ is larger than 0.14 $\mu$m when the radius of curvature b at the end of the mark is 0.425 $\mu$m. At a linear speed of 5.65 m/s at the innermost track separated by 30 mm from the center of the optical disk having a diameter of 130 mm, the disk being rotated at 1800 rpm, the value of $\delta$ corresponds to 25 nS (nano-seconds). At the outermost track of the disk separated from the disk center by 60 mm, the linear speed is 11.3 m/s and the value of $\delta$ is reduced in half to 12.5 ns.

Let us examine the WDL/RDL compensation issue in more detail. Let us first express equation (4) in a slightly different form, $$L_n = L_1 + (n-1)\cdot \Delta L \tag{4a}$$

where L is used as a short representation for RDL as stated above and L is given already in equation (4).

We will next express equation (5) in a slightly different form, $$\delta_n = WDL_n L_n \tag{5a}$$

where n in both equations (4) and (5) starts at 1 and ends at $k-d+1$ for a (d,k) code.

From equations (4a) and (5a), it is easy to show that, $$WDL_n = WDL_1 + (n-1)\cdot \Delta L + (\delta_n - \delta_1) \tag{6}$$

Equation (6) tells us that, when we create $WDL_n$ by n pulses, the pulse-to-pulse separation corresponds to $\Delta L$ and the timing of the last pulse in the pulse train will be corrected by an amount corresponding to $\delta_n - \delta_1$. The timing correction can also be carried out with the first pulse or with any one of the pulses in the pulse train. As a practical matter the last pulse or the first pulse is the most convenient place to do the correction. In the time domain, the pulse-to-pulse separation is $\Delta L/v$ and the timing correction is $(\delta_n - \delta_1)/v$, where v is the linear speed of the disk.

Let us do an example using FIG. 2. Assume that desired shortest read mark length, $L_1$, is 1 $\mu$m, then $\delta_1$ is 0.05 $\mu$m. For (2,7) code, L is 0.33 $\mu$m, according to eq. (4) and $L_2$ is thus 1.33 $\mu$m; therefore $\delta_2$ is, from FIG. 2, 0.133 $\mu$m. Thus the required compensation is $\delta_2 - \delta_1$ of 0.083 $\mu$m. In time domain terms, for a disk rotating at 1800 rpm with a corresponding linear speed of 5.65 M/s at a radius of 30 mm in a 130 mm diameter disk, the pulse-to-pulse separation is 48 nS and the last pulse timing is delayed by 15 nS, in other words, the last pulse is separated from the next-to-the-last pulse by 73 nS.

Now let us examine the pulse-to-pulse spacing issue in more detail. While the pulse spacing is 58 nS at 30 mm radius, it becomes 29 nS at 60 mm radius in the above example. The pulse spacing will be even smaller at higher rotational rates than 1800 rpm. This will result in pulse crowding unless each pulse is much narrower than 30 nS which means a very high power laser would be required. The situation is better for the (1,7) code. The pulse-to-pulse spacing is now 0.5 $\mu$m which corresponds to 88 nS at 30 mm radius or 44 nS at 60 mm radius. This is why it was stated earlier that this embodiment is more suitable for a code with a low "d" value. But even here the pulse crowding will quickly become an issue if the rotation rate becomes significantly larger than 1800 rpm. This is where the second mode of operation in the invention can be advantageously utilized.

FIG. 3 represents a second embodiment for carrying out the second mode of operation of the edge recording method according to the invention. In this embodiment, there are provided two pulse series which are exclusively used for recording odd and even numbered mark lengths, respectively as illustrated in FIGS. 3C and 3D. FIGS. 3A and 3B show the converted channel bit stream with ECC and the desired mark lengths, respectively. Within each series the individual pulses are identical in power and pulse width. That is to say, the first and second pulse series have the pulse width $\tau_{w1}$ and $\tau_{w2}$ respectively. The pulse intervals of the first and second pulse series are identical with each other and are represented by $\tau_i$ except for the last pulse which is represented by $\tau_i'$. Since the mark length change of two units of $\Delta L$ corresponds to each additional pulse within a given series, the pulse separation is approximately twice as long as that of the first mode of operation utilized in the first embodiment. This will avoid a pulse crowding in the time domain mentioned earlier and it is suitable for a code with a large "d" value such as the (2, 7) code. Of course, it is also suitable for low "d" codes such as the (1, 7) code.

FIGS. 4A to 4D show the computer simulation of the second embodiment. The first four mark boundaries, $L_1$, $L_2$, $L_3$ and $L_4$ of (2, 7) code are created to the desired length of 0.9 $\mu$m, 1.2 $\mu$m, 1.5 $\mu$m and 1.8 $\mu$m, respectively. $L_1$ and $L_3$ are created with a pulse width of 30 nS while $L_2$ and $L_4$ are created with a pulse width of 50 nS. In this computer simulation, it is assumed that RLD and WLD are the same, therefore no purposeful adjustment of the last pulse is used for the simulation.

Figure 5A:
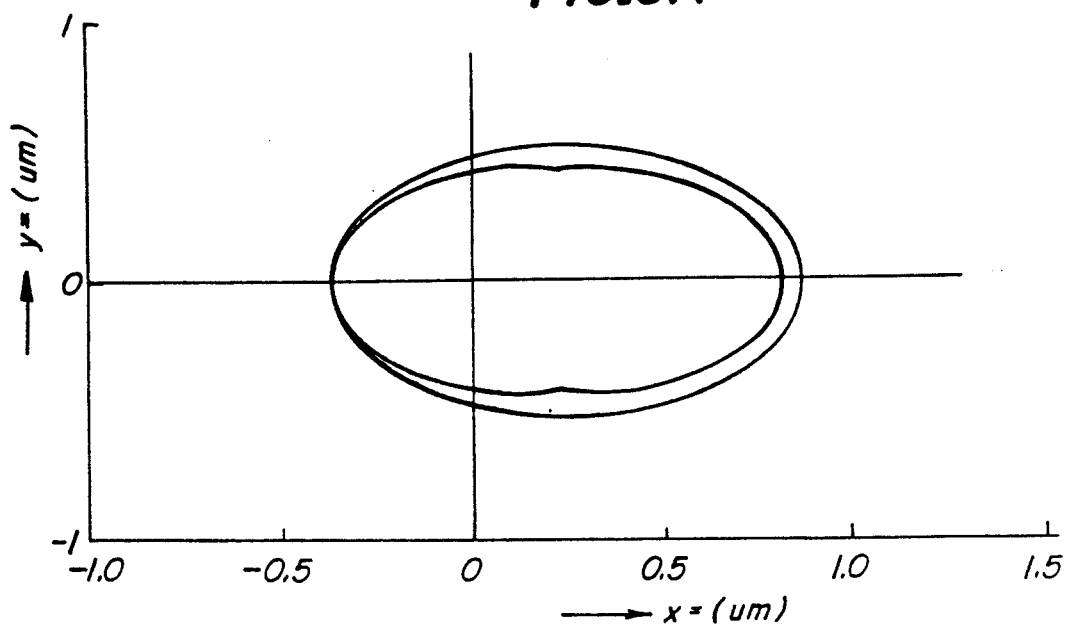
FIGS. 5A and 5B depict the enlargement of the written marks with and without considering the influence of residual heat.
Figure 5B:
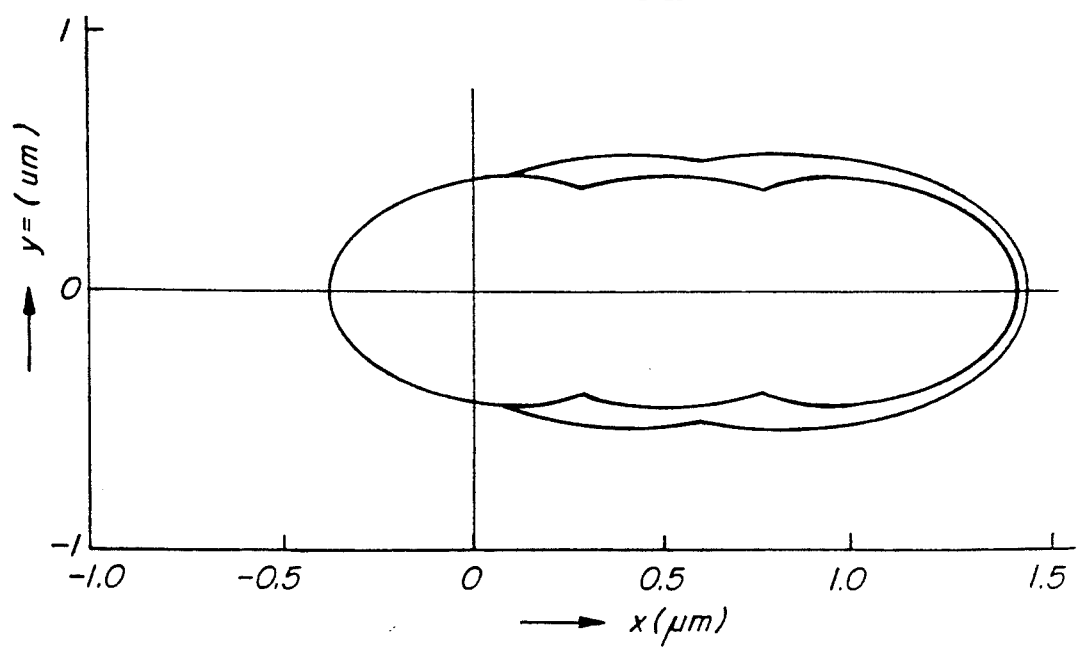

Another complication worth discussing is the residual heat effect when the edge recording method to which the method according to the invention belongs is employed. When a pulse is finished, the temperature at the spot of interest will drop very quickly at first, followed by a relatively slower drop. Thus, when the next pulse is applied, the residual heat from the previous pulse will contribute to an enlargement of the second mark compared to that formed by the first pulse. This is illustrated in FIGS. 5A and 5B for double pulse addition and for triple pulse addition cases, respectively. It is clear then that the resultant mark taking into account of residual heat is larger than the one without residual heat. This enlargement effect is relatively strong in the first mode of operation of the edge recording method according to the invention and is minimal in the second mode of operation of the edge recording method according to the invention. According to the invention this unwanted enlargement of the written mark length can also be compensated for by adjusting the timing of the last pulse in a plurality of recording pulses for writing a longer length mark. That is, equation (6) can be modified to include compensation of the residual heat, $$WDL_n = WDL_1 + n\cdot \Delta L + (\delta_n - \delta_1) - \delta_{RH} \tag{6a}$$

where 6z is the enlargement caused by residual heat. Note that generally the compensation associated with $(\delta_n - \delta_1)$ and that associated with $\delta_{RH}$ have opposite signs.

In a third embodiment of the edge recording method according to the present invention, the laser power is adjusted in addition to the adjustment of the timing of the last recording pulse in order to compensate for mark length variation caused by media sensitivity change from one disk to another and by temperature variation in the drive. Since media sensitivity data can be stored in the control track of the disk, one can decide the nominal write power a-priori. Regarding drive temperature change, one has to rely on some feedback means to indicate that a change in the mark length has occurred and then adjust the correction amount as well as the laser power accordingly. Generally change in the energy density threshold of mark formation E caused by the media sensitivity variation from one vendor to another or even from one lot to another is more serious than temperature-induced variation which accounts for less than ±3% mark length change over the entire drive specification range of 5° C. to 45° C. Therefore, another strategy is to ignore the temperature effect for low "d" value codes such as (1, 7) code, see equation (3) mentioned above, and take care of the media sensitivity variation only.

The reason that laser power adjustment is effective in compensating for the mark length change caused by the media sensitivity and drive temperature can be seen by examining the temperature buildup to form a mark. Under adiabatic assumptions, it is not hard to show that the mark boundary is given by, $$y(x) = (a/\sqrt{2})[Ln\{(P/vaE_{th}) \cdot t(x)\}] \quad (7)$$

where Ln is the natural log and 2a is the Gaussian diameter of the optical spot, v is the linear speed of the rotating disk, P is the optical power and E is energy density threshold of mark formation. t(x) is, $$t(x) = erf(\sqrt{2}x/a) + erf\{(\sqrt{2}(v\tau - x)/a)\} \quad (8)$$

It is clear from equation (7) that P scales with $E_{th}$ linearly. Since the variations in the media sensitivity and in temperature all result in change in $E_{th}$, it can be completely compensated for by adjusting the laser power P.

Figure 6:
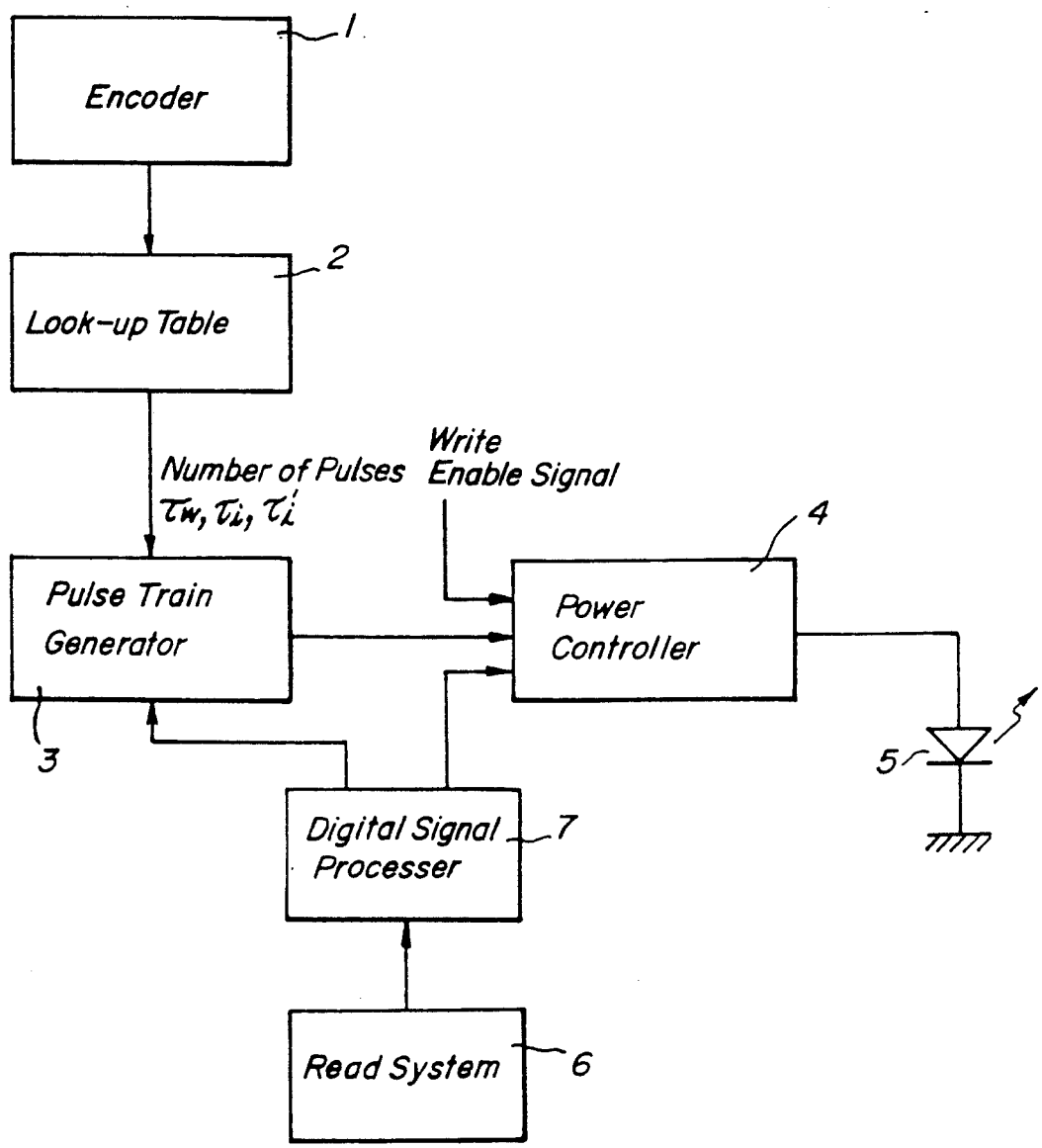
FIG. 6 is a block diagram showing a first embodiment of the apparatus for carrying out the edge recording method according to the invention.

FIG. 6 is a block diagram showing an embodiment of an apparatus for carrying out the first embodiment of the edge recording method according to the invention. In FIG. 6, a reference numeral 1 denotes an encoder for converting input data bits into a channel bit stream having re-synchronizing pulses and ECC added thereto. The channel bit stream generated by the encoder 1 is supplied to a look-up table 2. Then the look-up table 2 generates recording pulse data for successive channel bits. That is to say, in the look-up table 2 there has been stored a table representing the relationship between the channel bits and recording pulse data. The recording pulse data includes the number of writing pulses, pulse width $\tau_W$ and first and second pulse intervals $\tau_i$ and $\tau_i'$. The recording pulse data thus produced by the look-up table 2 is then supplied to a pulse train generator 3 which generates a series of writing or recording pulses in accordance with the recording pulse data. The thus generated recording pulses are supplied to a power controller 4 to which is also supplied a write enable signal. The writing signal thus generated by the power controller 4 is supplied to a semiconductor laser diode 5 which produces a laser beam which is modulated or turned-on and -off in accordance with the recording pulses. The laser beam thus generated by the laser diode 5 is made incident by means of a suitable optical head upon an optical record disk not shown to write the input data thereon. The optical record disk may be a magneto-optic record disk or optical disk of write-once type. In the present embodiment, the control data inherent to the record disk has been written in a control track of the record disk. Such control data is first read out of the disk with the aid of a read system 6 and a is supplied to a digital signal processor 7 which produces various control signals to the pulse train generator 3 and power controller 4 in accordance with the read out control data. That is to say, the pulse width $\tau_W$ and first and second pulse intervals $\tau_i$ and $\tau_i'$ of the recording pulse train and the power of the laser beam are controlled such that the marks having the desired lengths can be written on the optical record disk accurately.

Figure 7:
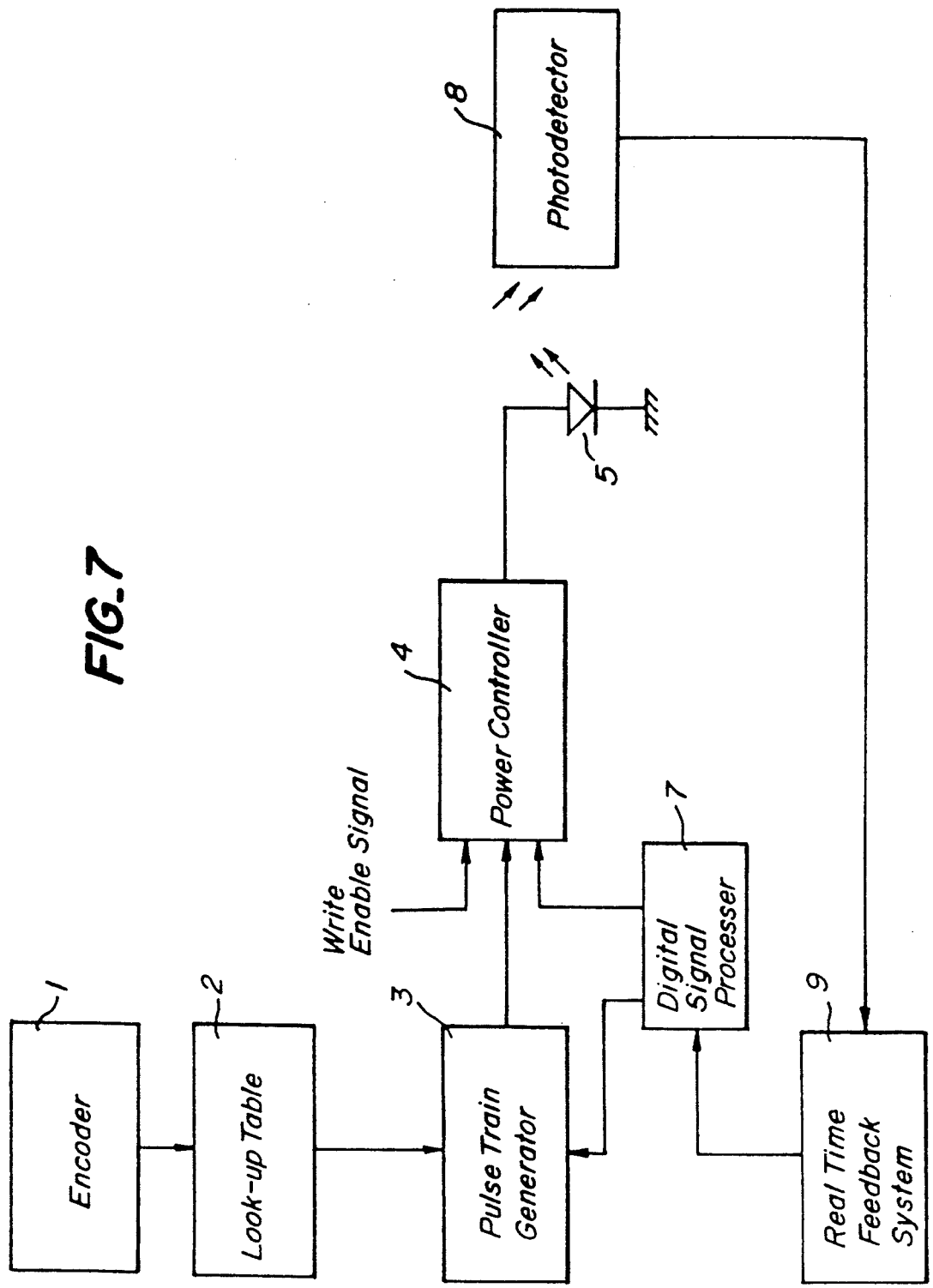
FIG. 7 is a block diagram illustrating a second embodiment of the apparatus for performing the edge recording method according to the invention.

FIG. 7 is a block diagram depicting another embodiment of the apparatus for performing the method according to the invention. In FIG. 7 portions similar to those of the embodiment shown in FIG. 6 are denoted by the same reference numerals used in FIG. 6 and their detailed explanation is dispensed with. In this embodiment, the control signals for the pulse train generator 3 and power controller 4 are generated by reading the written marks on the real time mode. To this end, laser light reflected by the optical record disk during the recording is received by a photodetector 8 to read the just written marks. The output generated by the photodetector 8 is supplied to a real time feedback system 9, and then is further supplied to the digital signal processor 7. The digital signal processor 7 generates the control signals in accordance with read out marks, and the control signals are supplied to the pulse train generator 3 and power controller 4. In this manner, the power of the recording laser beams and the pulse width $\tau_W$ and first and second pulse intervals $\tau_i$ and $\tau_i'$ are controlled such that the marks having the desired mark lengths can be always written regardless of the media sensitivity variation and temperature variation.

Figure 8:
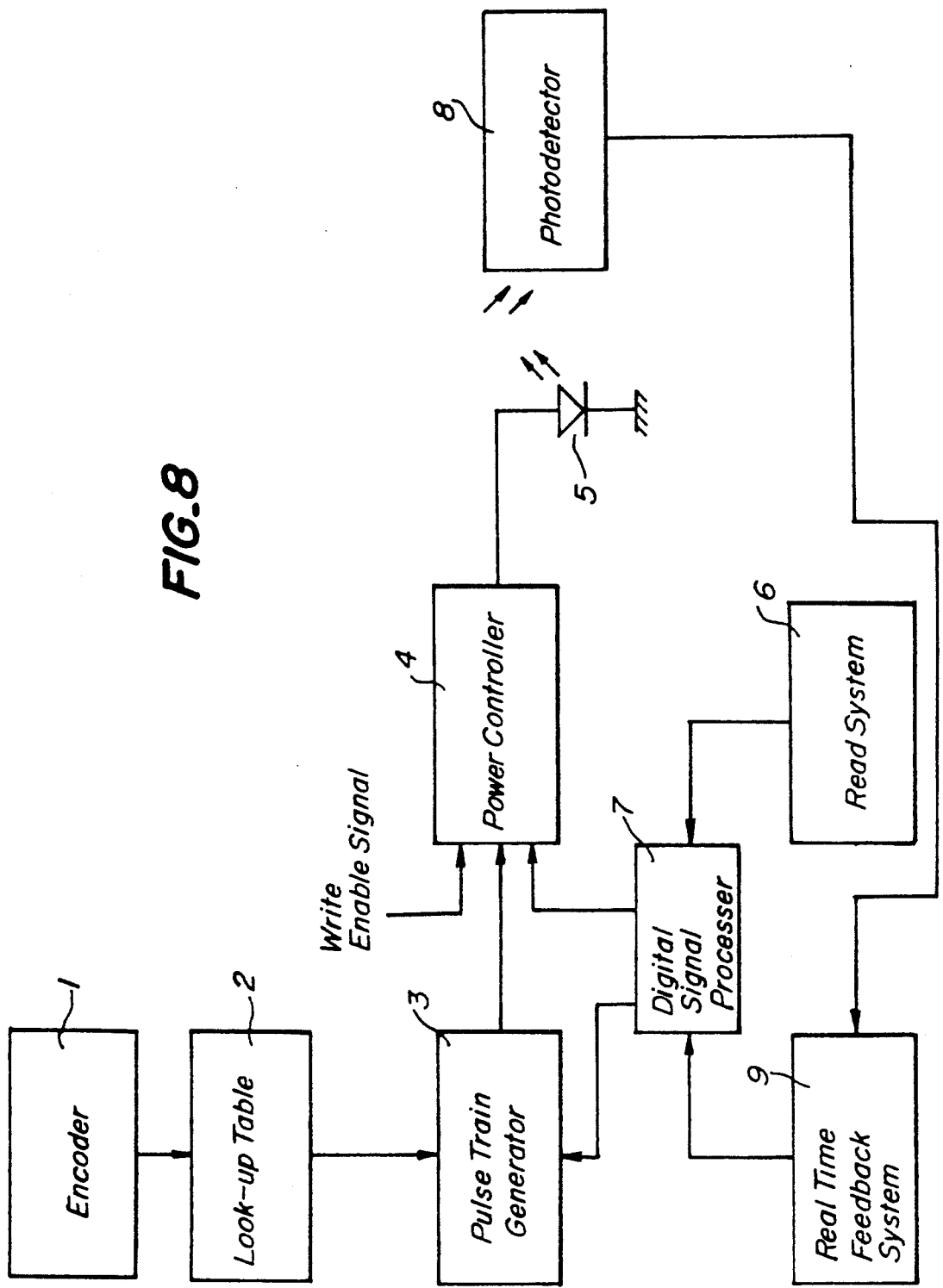
FIG. 8 is a block diagram depicting a third embodiment of the apparatus for carrying out the edge recording method according to the invention.

FIG. 8 is a block diagram showing still another embodiment of the apparatus for carrying out the edge recording method according to the invention. Also in the present embodiment, portions similar to those shown in FIGS. 6 and 7 are denoted by the same reference numerals in FIGS. 6 and 7. In the present embodiment, the control data recorded in the control track of the optical record disk is read out of the disk and is supplied to the digital signal processor 7 via the read signal processing system 6. At the same time, light reflected by the optical record disk during the recording is received by the photodetector 8 to detect the just written marks and the read out signal is supplied to the digital signal processor 7 by means of the real time feedback system 9. In the present embodiment, at first the pulse width and pulse intervals as well as the laser beam power are adjusted in accordance with the control data read out of the control track on the disk, and during the recording process they are controlled in accordance with the read out mark signal under the real time feedback control. In this manner, the channel data can be recorded very accurately.

Figure 9:
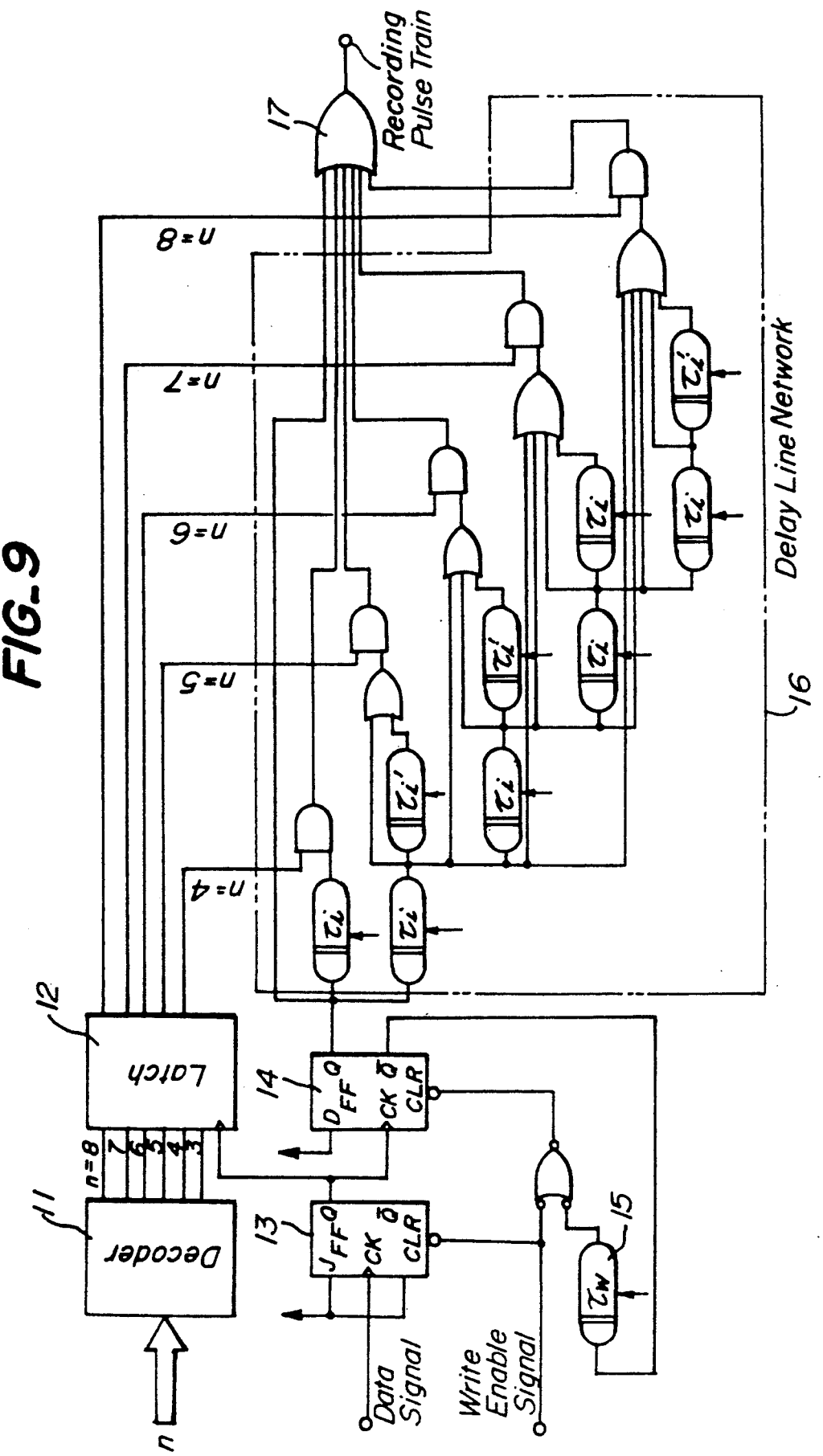
FIG. 9 is a block diagram showing an embodiment of the pulse train generator shown in FIGS. 7, and 8.
Figures 10A, 10B, 10C, 10D, 10E, 10F:
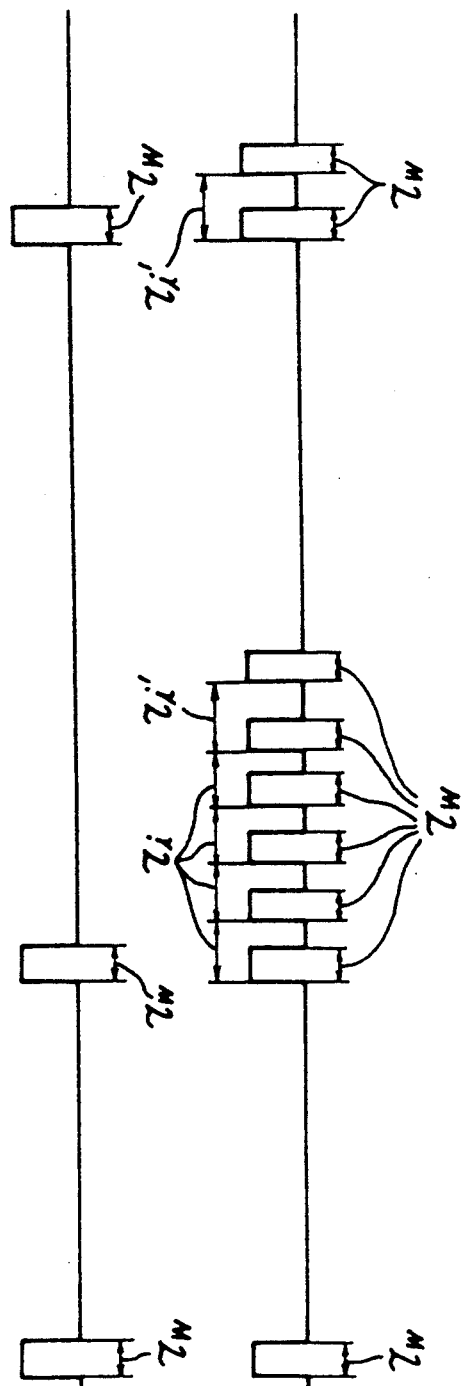
FIGS. 10A to 10F are diagrams representing the operation of the pulse train generator shown in FIG. 9.

FIG. 9 is a block diagram illustrating an embodiment of the pulse train generator 3. The pulse train generator comprises a decoder 11 for decoding the number m of the distance between successive "1" bits in the channel bit stream and an output signal of the decoder is set in a latch 12. To this end it should be noted that the converted channel bit stream is delayed by, for instance, 8 bits. A channel bit stream in FIG. 10A shows such a delayed channel bit stream with ECC. The delayed channel bit stream is supplied to a clock input of a first flip-flop 13 whose Q output is connected to a clock input of a second flip-flop 14. To clear inputs of the first and second flip-flops 13 and 14, the write enable signal is supplied to make the flip-flops enabled to receive the channel bit signal. FIG. 10B represents the data signal supplied to the flip-flop 13. The data signal is changed into a logic high level each time the channel bit changes from "0" to "1". FIG. 10C depicts the distance between successive "1" bits, i.e., the number of "0" bits between successive "1" bits plus one. When the data signal is supplied to the first flip-flop 13, its Q output produces a signal shown in FIG. 10D. The second flip-flop 14 is triggered by the rising edge of the Q output signal of the first flip-flop 13 and its Q output is changed into a logic high level. $\overline{Q}$ output signal generated from the second flip-flop 14 is supplied to a delay line 15 having a delay time of $\tau_W$ which can be set by the control signal supplied from the look-up table 2 and digital signal processor 7. Then the delayed signal is supplied to the clear terminal of the second flip-flop 14 so that the Q output is changed into the logical low level. In this manner the Q output signal of the second flip-flop 14 becomes as shown in FIG. 10E. The Q output of the first flip-flop 13 is supplied to the latch 12 as the clock pulse. The Q output of the second flip-flop 14 is supplied to a delay line network 16 comprising a first set of delay lines each having a delay time of $\tau_i$ and a second set of delay lines having a delay time of $\tau_i'$, OR gates and AND gates. Also these delay times $\tau_i$ and $\tau_i'$ can be adjusted by means of the control signals supplied from the look-up table 2 and digital signal processor 7. To one inputs of the AND gates in the delay line network 16 are connected one of the outputs of the latch 12 which produces a logical high level signal in accordance with the number n of the distance between successive "1" bits. For instance when the number n is equal to 3, the Q output of the second flip-flop 14 is directly supplied to an OR gate 17 to generate a single recording pulse having a pulse width of $\tau_W$ as illustrated in FIG. 10F. When the number n of the bit distance is equal to to 8, then the Q output of the second flip-flop 14 includes five pulses having the pulse width $\tau_W$ with the pulse interval $\tau_i$ and one pulse having the pulse width $\tau_W$ with a different pulse interval $\tau_i'$. In this manner the pulse train having the desired pulse construction is generated in accordance with the channel bit stream. In the present embodiment, the system is constructed to operate in an asynchronous mode on the basis of "1" in the channel bit stream, but according to the invention the system may be constructed as a synchronous one which operates on the basis of a clock signal supplied from the external. Further it should be noted that the pulse train generator 3 may be formed in various manners within the scope of the invention.

In the embodiments so far explained, the timing of the last pulse within a plurality of pulses for recording a single mark having a length longer than the unit length is advanced with respect to the remaining pulses. According to the invention it is also possible to delay the first pulse among a plurality of pulses with respect to the remaining pulses, as explained below.

Figure 11:
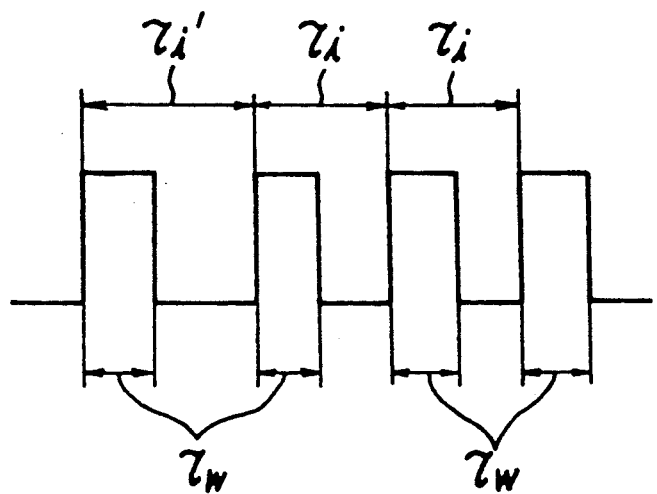
FIG. 11 illustrates a third embodiment of the edge recording method according to the invention.

FIG. 11 shows a fourth embodiment of the edge recording method according to the invention in which a timing of the first pulse among a plurality of pulses for writing a longer mark is delayed by a suitable time. That is to say, a pulse interval $\tau_i'$ between the first pulse and the second pulse is different from the pulse interval $\tau_i$ between the second and third pulses, the third and fourth pulses and so on, but the pulse widths of all the pulses are identical with each other. This embodiment is obviously sound by examining equation (6a), where the required compensation is always $(\delta_n-\delta_1)-\delta_{RH}$ no matter where the adjustment takes place.

Figure 12:
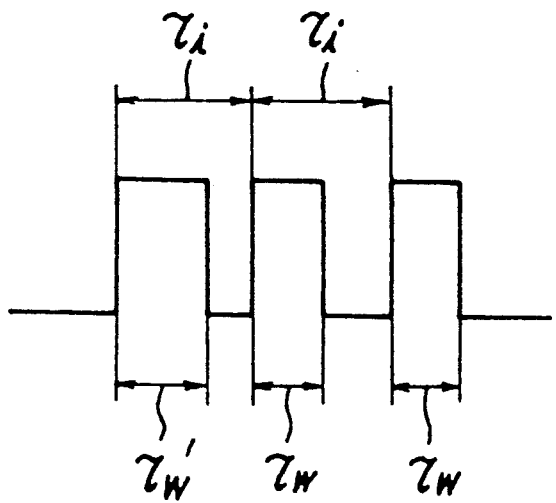
FIG. 12 shows a fourth embodiment of the edge recording method according to the present invention.

FIG. 12 illustrates a fifth embodiment of the edge recording method according to the invention. In the present embodiment, a pulse width $\tau_W'$ of the first pulse is different from the pulse width $\tau_W$ of the remaining pulses. It should be noted that the pulse intervals $\tau_i$ between successive pulses are identical. What is being done in this embodiment can be understood more clearly by re-arranging terms in equation (6a) as, $$WDL_n = \{WDL_1 + (\delta_n - \delta_1) - \delta_{RH}\} + (n-1)\cdot\Delta L \quad (6b)$$

Thus, the first pulse width becomes $\tau_W'$ in order to create a written mark length equal to $\{WDL_1+(\delta_n-\delta_1)-\delta_{RH}\}$; in so doing, the succeeding pulses are all uniformly spaced by $\Delta L$. This method is satisfactory only if $\delta_n-\delta_1$ saturates to a constant when $n>2$. As an example, again using FIG. 2, if the (1, 7) code is used and $L_1$ is 1 $\mu$m, then $L_2$ is 1.5 $\mu$m where $\delta_2-\delta_1$, already saturates, therefore this embodiment can be used safely.

What is claimed is:

1. A method of recording data by edge recording on an optical recording medium, the edge recording comprising the use of odd- and even-numbered marks, the method comprising:

converting input data to be recorded into a channel bit stream;

generating a recording pulse train of a first pulse series in accordance with the channel bit stream for recording said odd-numbered marks such that a longer mark than a unit length mark is recorded with a first plurality of recording pulses, a last pulse within said first plurality of recording pulses having its timing adjusted with respect to the remaining pulses within said first plurality of recording pulses;

generating a recording pulse train of a second pulse series in accordance with the channel bit stream for recording said even-numbered marks such that a longer mark than a unit length mark is recorded with a second plurality of recording pulses, a last pulse within said second plurality of recording pulses having its timing adjusted with respect to the remaining pulses within said second plurality of recording pulses, said second pulse series having pulse widths different from pulse widths of said first pulse series; and modulating a light beam to be made incident upon the optical record medium in accordance with said adjusted recording pulse train.

2. A method according to claim 1, wherein the input data is converted into the channel bit stream with (2, 7) run length limited code.

3. A method according to claim 2, wherein control data stored in a control track of the optical record medium is read out and power of the writing light beam is controlled in accordance with the read out control data.

4. A method according to claim 2, wherein a light beam reflected from the optical record medium during the recording is read out to derive a mark signal and at least one of the power of writing light beam, the pulse width and timing of the last pulse is controlled in accordance with the mark signal on a real time control mode.

5. A method according to claim 1, wherein the input data is converted into the channel bit stream with (1, 7) run length limited code.

6. A method according to claim 5, wherein control data stored in a control track of the optical record medium is read out and power of the writing light beam is controlled in accordance with the read out control data.

7. A method according to claim 5, wherein a light beam reflected from the optical record medium during the recording is read out to derive a mark signal and at least one of the power of writing light beam, the pulse width and timing of the last pulse is controlled in accordance with the mark signal on a realtime control mode.

8. A method according to claim 1, wherein control data stored in a control track of the optical record medium is read out and power of the writing light beam is controlled in accordance with the read out control data.

9. A method according to claim 1, wherein a light beam reflected from the optical record medium during the recording is read out to derive a mark signal and at least one of the power of writing light beam, the pulse width and timing of the last pulse is controlled in accordance with the mark signal on a real time control mode.

* * * * *